United States Patent [19]

Harwood, III et al.

[11] Patent Number: 6,079,015
[45] Date of Patent: Jun. 20, 2000

[54] DATA PROCESSING SYSTEM HAVING SELECTABLE EXCEPTION TABLE RELOCATION AND METHOD THEREFOR

[75] Inventors: Wallace B. Harwood, III; James B. Eifert, both of Austin, Tex.; Rami Natan; Yossi Asher, both of Ramat Gan, Israel; Avi Ginsberg, Petach-Tikua, Israel

[73] Assignee: Motorola, Inc., Schaumburg, Ill.

[21] Appl. No.: 09/062,952

[22] Filed: Apr. 20, 1998

[51] Int. Cl.[7] ........................................ G06F 12/02
[52] U.S. Cl. ............................................. 712/244
[58] Field of Search ........................ 712/244; 711/221; 710/269

[56] References Cited

U.S. PATENT DOCUMENTS

| | | | |
|---|---|---|---|
| 4,744,048 | 5/1988 | Blanget et al. | 345/333 |
| 4,802,119 | 1/1989 | Henne et al. | |
| 5,222,226 | 6/1993 | Yamaguchi et al. | |
| 5,615,400 | 3/1997 | Couesar et al. | 709/332 |
| 5,903,718 | 5/1999 | Marik | 714/38 |

*Primary Examiner*—William M. Treat
*Attorney, Agent, or Firm*—Daniel D. Hill

[57] ABSTRACT

A data processing system (20) has a central processing unit (CPU) (22) and a memory (30) for storing an exception table. The exception table is mapped in the memory (30) in consecutive segments, with each segment for storing a predetermined number of instructions for executing the exception. By asserting a control bit, the exception table can be relocated, or remapped, and compressed into a jump table. The jump table stores only jump instruction for branching to the exception routines, which are relocated to other memory locations. The jump table is generated from the starting addresses of the exception routines. Relocating the exception routines allows for more efficient use of internal memory space of the data processing system (20).

17 Claims, 3 Drawing Sheets

```
     ETRE = EXCEPTION TABLE RELOCATION
     OERC = OTHER EXCEPTIONS RELOCATION CONTROL
  INT_MAP = INTERNAL MAPPING
```

6,079,015

DATA PROCESSING SYSTEM HAVING SELECTABLE EXCEPTION TABLE RELOCATION AND METHOD THEREFOR

FIELD OF THE INVENTION

The present invention relates in general to data processing, and more particularly to exception table relocation in a data processing system.

BACKGROUND OF THE INVENTION

Integrated circuit data processing systems, such as microprocessors and microcontrollers generally include onboard, or internal, memory for storing instructions and/or data. The internal memory may be composed of volatile memory, such as static random access memory (SRAM) or dynamic random access memory (DRAM), or non-volatile memory, such as electrically programmable read only memory (EPROM) or flash memory, or a combination of volatile or non-volatile memory. Generally, because of size and cost considerations, the amount of internal memory is not unlimited, and some applications may require that additional, expensive, external memory be used in the design.

Exceptions, or interrupts, are used in many data processing systems in response to external signal, errors, or unusual conditions arising in the execution of instructions. When an exception occurs, normal instruction execution stops, and the data processing system begins executing a specific exception routine that has been provided for handling the particular exception. There may be many types of exceptions and a different exception routine would be required for handling each exception type. For example, the exception routine for handling a reset will be different than the exception routine for handling an overflow condition. Also, a data processing system used in one application may require different exception routines than the same data processing system used in another application.

The internal memory space may be mapped into a number of prearranged consecutive locations in a tabular form for storing the exception routines. Each of the locations are mapped to contain a predetermined number of instructions for implementing one exception routine. However, mapping prearranged locations for the exception table may result in wasting valuable memory space if, for example, the exception routine does not require all of the memory space of the prearranged location.

DETAILED DESCRIPTION OF THE DRAWINGS

Figure 1:
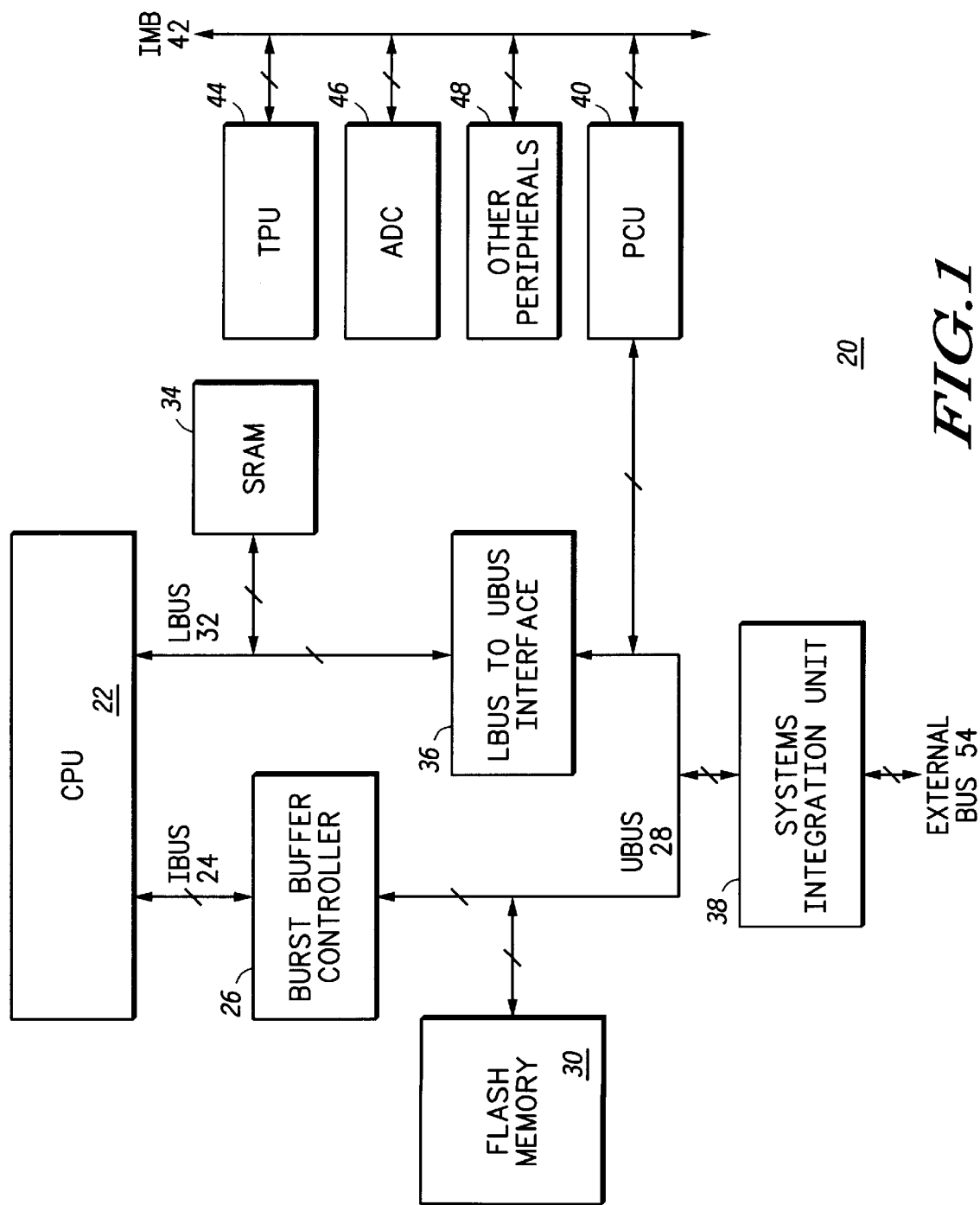
FIG. 1 illustrates, in block diagram form, a data processing system in accordance with one embodiment of the present invention.

Generally, the present invention provides a data processing system having a central processing unit (CPU) and a memory for storing an exception table. The memory can be segmented in either one of two different user selectable memory maps for storing the exception table, thus allowing for more efficient memory usage depending on the application. In one memory map, the exception table is mapped into the memory in prearranged consecutive segments, with each segment for storing a predetermined number of instructions for executing the exception. In response to asserting a control bit, the memory space for storing the exception table can be remapped as a jump table. The jump table contains only a plurality of branch instructions. Each of the branch instructions is for jumping to a corresponding relocated exception routine when exception processing is required.

There are several cases where it may be desirable to relocate the exception table. For example, relocation may be desirable if the number of instructions for executing an exception are larger than the available space of one of the consecutive segments. Likewise, relocation may be desirable if the number of instructions is much smaller than the available space. The instructions for executing the exceptions can be relocated anywhere within the memory space of the data processing system. Relocating the exception routines in this manner allows for more efficient use of the memory space by a compiler.

The term "bus" will be used to refer to a plurality of signals or conductors which may be used to transfer one or more various types of information, such as data, addresses, control, or status. Although the terms "integrated circuit pin" and "pin" are used throughout this document, these terms are intended to encompass any type of apparatus which allows electrical signals to be transferred to or from an integrated circuit, such as, for example, integrated circuit bonding pads, solder bumps, wire conductors, etc.

In the following description, numerous specific details are set forth to provide a thorough understanding of the present invention. However, it will be obvious to those skilled in the art that the present invention may be practiced without such specific details. In other instances, circuitry has been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 illustrates, in block diagram form, a data processing system 20 in accordance with one embodiment of the present invention. In the illustrated embodiment, data processing system 20 is a single-chip microcontroller having a central processing unit and various peripheral circuits. Data processing system 20 includes CPU 22, burst buffer controller 26, flash memory 30, static random access memory (SRAM) 34, systems integration unit 38, peripheral bus controller (PCU) 40, time processing unit (TPU) peripheral 44, analog-to-digital converter (ADC) peripheral 46, and a block 48 representing other peripherals, such as for example, timers, serial and parallel communication interfaces, and additional memory components.

Burst buffer controller 26 is bi-directionally coupled to the CPU 22 via an instruction bus (I bus) 24. SRAM 34 is bi-directionally coupled to CPU 22 via local bus (L bus) 32. L bus to U bus interface 36 is used to couple L bus 32 to a unified bus (U bus) 28. L Bus 32 is used for memory loads and stores to SRAM 34. U bus 28 is used to bi-directionally couple burst buffer controller 26, flash memory 30, SIU 38, PCU 40, and L bus to U bus interface 36 together. SIU 38 is provided to interface U bus 28 to an external bus 54, thus providing an interface between data processing system 20 and the external world. TPU 44, ADC 46, and block 48 are each bi-directionally coupled to a peripheral bus, or inter-module bus (IMB) 42. PCU 40 couples U bus 28 to IMB 42.

In one embodiment, CPU 22 may be a microprocessor core which is based on the PowerPC family of microprocessors, available from Motorola, Inc. of Austin, Tex. In other embodiments, it may be any general purpose CPU.

The exception table map of data processing system 20 uses about 8 kilobytes of internal memory space, such as for example, flash memory 30. The 8 kilobytes of memory is mapped into segments of predetermined size, where each segment stores an exception routine. In the illustrated embodiment, each segment can hold 64 instructions. Note that in other embodiments, flash memory 30 may be any type of volatile or non-volatile memory. During normal operation, data processing system 20 fetches and executes program instructions. When an exception occurs, such as an interrupt, data processing system 20 discontinues normal program execution, jumps to the exception table of flash memory 30, and begins executing the appropriate exception routine. After the exception routine is executed, normal program execution resumes.

Depending on the application, a system designer using data processing system 20 may elect to store the exception routine in another memory space and use the exception table memory segments to store only jump instructions to the exception routine. For example, the exception routine may be moved because it is too large to fit into the exception table memory segments. Also, the exception routine may be moved simply for convenience. However, moving the exception routines in this manner wastes the memory space of data processing system 20 because the exception table map memory space remains largely unused.

Figure 4:
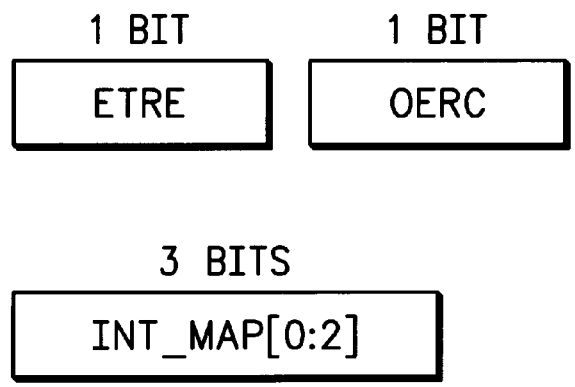
FIG. 4 illustrates, in block diagram form, certain register bit fields of the data processing system of FIG. 1.

Burst buffer controller 26 contains circuitry for relocating and compressing the exception table. The relocation feature is enabled by asserting a control bit labeled "ETRE" (FIG. 4). The relocation feature, when enabled, remaps, or relocates, the exception table in flash memory 30. When relocated, the exception table is replaced with a 32 entry jump table, and includes only branch, or jump, instructions to the actual exception routines which are placed at another memory location. This allows the exception routines to be separated from the jump table, thus giving the system designer programming flexibility while conserving valuable memory space. However, note that when the exception table is relocated, additional fetch and execute time is required because of the extra branch instruction in the jump table.

Flash memory 30 is block erasable in 32 kilobyte blocks. Some of the blocks may be designated as non-erasable to protect certain instructions, such as instructions used to program flash memory 30. For example, the protected non-erasable portion of flash memory 30 is the lower 32 kilobytes. All jump table entries, except for the jump table entry for reset, can be controlled to either remain in the lower addresses (base address exception offset) of flash memory 30, or to be relocated to a flash memory 30 base address plus 32 kilobytes. Burst buffer controller 26 also includes logic for performing an address translation (not shown) for displacing, or offsetting, the jump table and/or the exception table within the address space of flash memory 30. In the illustrated embodiment, in addition to the flash memory programming instructions, the reset exception is fixed in the memory at lower addresses and cannot be relocated. This is done to prevent reprogramming of the reset exception routine. In other embodiments, it may be desirable to allow the reset exception routine to be relocated and reprogrammed. Also, some or all of the exception routines may be located in other memory, separate from flash memory 30, and which is located external to data processing system 20. The other memory may be located in another data processing system similar to data processing system 20, such as the multi-processor system illustrated in FIG. 3, and discussed later.

By relocating, or remapping, the exception table, wasted memory space between the exception table entries is recovered. This can be especially important when the exception table is included in on-chip memory.

Figure 2:
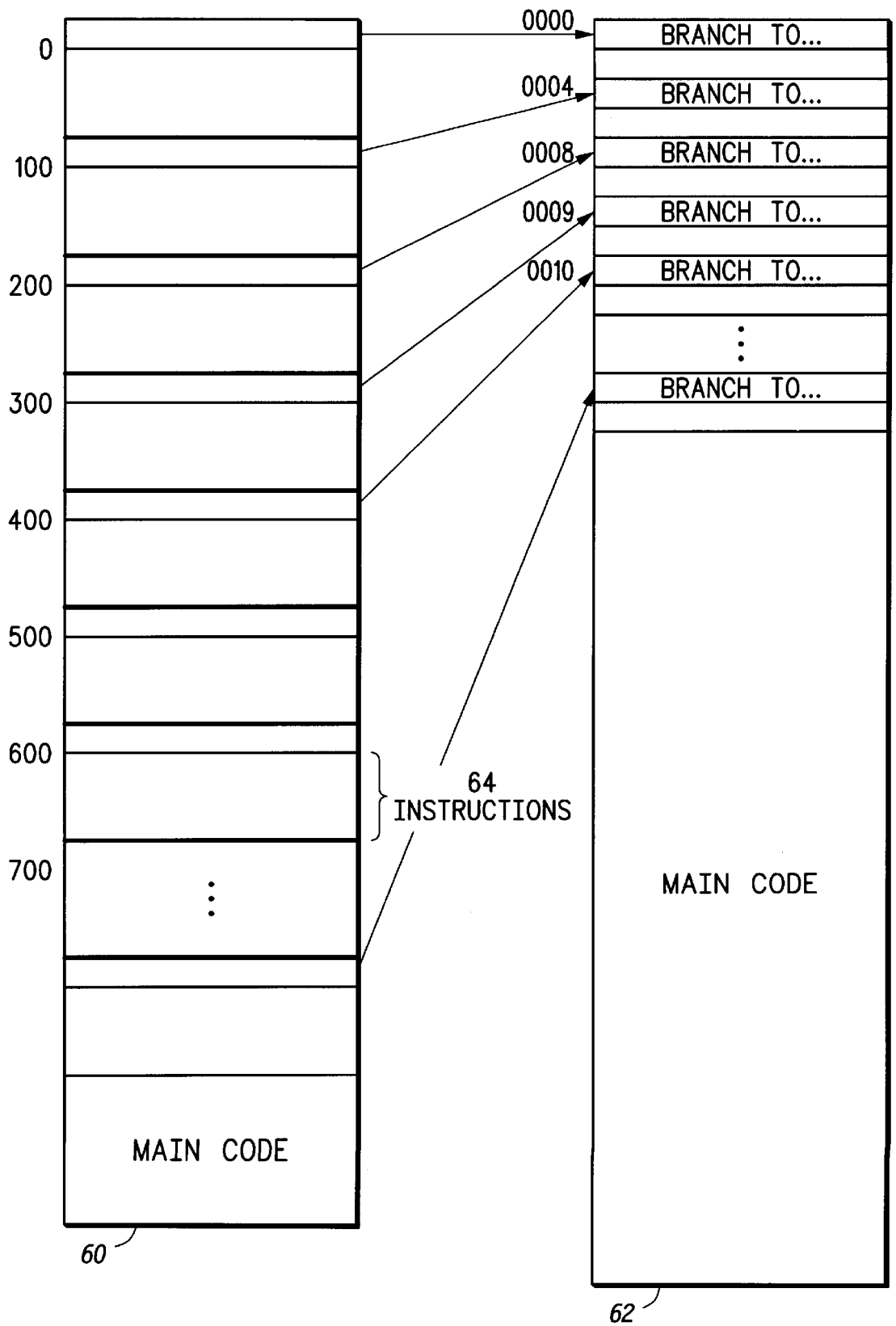
FIG. 2 illustrates, in block diagram form, memory map relocation and compression of the data processing system of FIG. 1.

FIG. 2 illustrates, in block diagram form, memory map relocation of the exception table of data processing system 20 of FIG. 1. FIG. 2 includes memory map 60 and memory map 62. In the illustrated embodiment, one of memory maps 60 and 62 is organized in flash memory 30 depending on the state of control bit ETRE. If control bit ETRE is not asserted, a portion of flash memory 30 is configured as memory map 60 for storing exception routines. Alternately, if the exception table relocation feature is used, control bit ETRE is asserted, and a portion of flash memory 30 is configured as memory map 62 for storing a jump table.

When the relocation feature is not used, memory map 60 is divided into a number of segments. Each segment has a fixed predetermined size and is used for storing the instructions of an exception routine. If the number of instructions for an exception routine is less than the size of the segment, then the extra space is unused. In FIG. 2, the numbers on the left side of memory map 60 indicate starting addresses for each of the segments. The rest of flash memory 30 is used for storing main program code.

When the relocation feature is used, the exception table is compressed into a jump table. Each location of the jump table is identified with an entry address, as indicated by the 4-digit numbers of on the left side of memory map 62. Note that the starting address and entry address numbers are for purposes of illustration only and may be different in other embodiments. Each entry address stores only one jump instruction that corresponds to an exception routine. The jump table is generated from the segment starting addresses of the exception table by remapping the segment starting addresses as the entry addresses of the jump table. Each entry address identifies a branch instruction for "jumping" to the starting address of the relocated exception routine. In the illustrated embodiment, the branch instructions are organized as a list of consecutive "branch to" instructions. The actual exception routines are then located anywhere with the memory space labeled "MAIN CODE" of memory map 62. Using the relocation feature to configure memory 30 as memory map 62 may allow for more efficient use of flash memory 30 by eliminating unused space.

Figure 3:
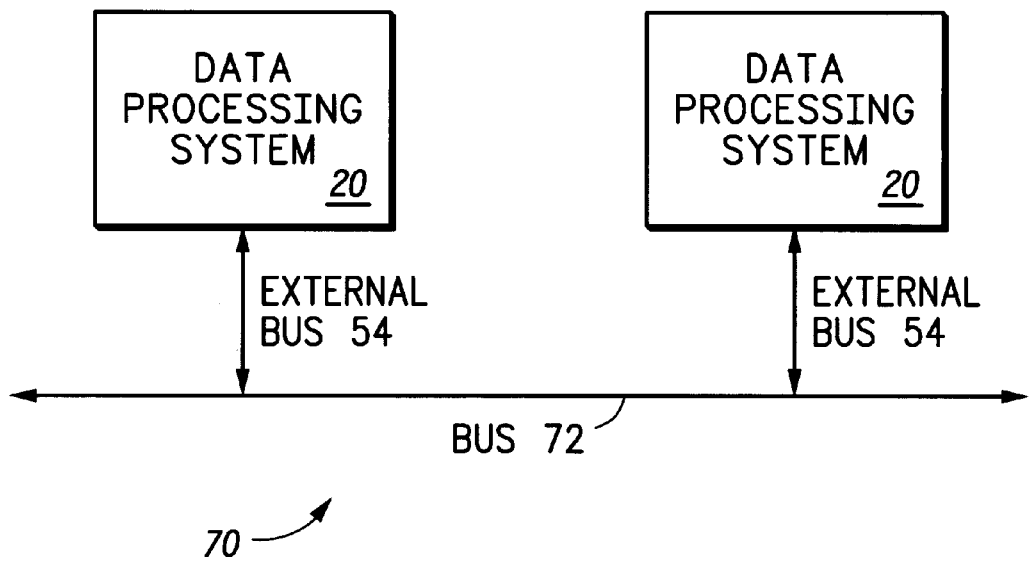
FIG. 3 illustrates, in block diagram form, a multi-processor system in accordance with another embodiment of the present invention.

FIG. 3 illustrates, in block diagram form, a multi-processor system 70 in accordance with another embodiment of the present invention. Multi-processor system 70 includes a plurality of bus master devices, or data processing systems, similar to data processing system 20. Each of data processing systems 20 are bi-directionally coupled to bus 72 via external bus 54. In multi-processor system 70, the internal memory of each of data processing systems 20 is accessible over bus 72 by the other data processing systems. Because the processors' internal memory space is shared, one exception table can be shared by all of the processors, and can be located entirely within one of the processors, or alternately, distributed among the memory spaces of the processors. Note that in the illustrated embodiment, both data processing systems coupled to bus 72 are substantially identical. In other embodiments, the data processing systems may not be similar to each other.

In multi-processor system 70, a control logic unit, such as burst buffer controller 26 (see FIG. 1), controls remapping of the exception table. If control bit ETRE (FIG. 4) is set at a first logic state, such as a logic "0", the control logic unit maps the addresses of the set of routines comprising the exception table in a predetermined order. As stated above, each of the set of routines includes instructions for handling a particular exception. When the control bit is set at a second logic state, such as a logic "1", the control logic unit replaces the addresses of the set of routines (exception table) with the addresses of the set of branch instructions (jump table entries). The set of branch instructions of the jump table are for branching, or jumping, to a corresponding one of the exception routines. Each of the jump table entries points to the starting addresses of each of the set of routines for executing the exceptions. The set of routines is placed in the memory at a location that is separate from the jump table entries. When control bit ETRE is a logic "1", the location of the jump table is remapped to internal memory 30 based on the logic states of control bits INT_MAP[0:2] which will be described later.

When exception processing is required, and the exception table has been remapped, normal program instruction execution halts, and the microprocessor handling the exception branches to a branch instruction of the set of branch instructions that corresponds to the exception routine. Another branch occurs to the address of the actual exception routine. The exception routine can be located anywhere in multi-processor system 70, thus allowing for flexible and efficient use of memory space in applications where memory space is at a premium.

The control logic unit allows two or more distinct memory devices to be addressable by a virtual address. This allows the memory space of one processor to be distinguished from the memory space of another similar processor when the memory spaces are shared by the two processors. The address translation logic is adapted to displace, or offset, the jump table and/or the exception table within the internal address space. Note that in the illustrated embodiment, if a reset exception occurs, any offset of the jump table is removed during reset exception processing. The relocation feature can be important in multi-processor system 70 because more than one processor of the system can have internal exception tables located in different memory spaces but with the same exception addresses. In accordance with the present invention, each of the processors can maintain its own separate exception routine set. Alternatively, one set of exception routines can be shared by all of the processors.

FIG. 4 illustrates, in block diagram form, certain register bit fields of the data processing system of FIG. 1. Control bit ETRE is the exception table relocation bit. When control bit ETRE is asserted, the exception table is remapped and compressed as discussed above. When control bit ETRE is not asserted, or negated, the exception table is not remapped. Control bit ETRE is located in a master control register of burst buffer controller 26, and can be reset by a reset configuration word (not shown).

A control bit labeled "OERC" is used to control offsetting of the start addresses of the exception routines. If control bit OERC is asserted, the start addresses of all of the exception routines, except for the reset exception routine, are moved by one 32 kilobyte block in flash memory 30. Control bit OERC is located in the master control register of burst buffer controller 26, and is not reset configurable.

Control bits INT_MAP [0:2] are internal mapping bits and are used to determine the addresses of the internal memory spaces of data processing system 20. Control bits INT_MAP [0:2] are provided to, and used by, burst buffer controller 26, flash memory 30, SRAM 34, and L bus to U bus interface 36. A bit field for control bits INT_MAP [0:2] is located in systems integration unit 38, and can be reset by the reset configuration word.

In a multi-processor system as illustrated in FIG. 3, control bits INT_MAP [0:2] are used to make the address ranges of the internal memory spaces of the processors different. For example, if one common set of exception routines is shared by the processors of the system, the exception routines may be stored in the internal memory of one of the processors. By insuring that the internal memories have different addresses, a jump instruction can be used by another processor to branch to the starting address of one of the set of exception routines. Also, if the exception routines are distributed among the processors, the control bits INT_MAP [0:2] allow branches to the internal memory of the processor having the appropriate exception routine, whether the exception routine is located within its own memory space or the memory space of another processor.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

What is claimed is:

1. A data processing system comprising:
   a processing unit for executing instructions; and
   a memory for storing a set of routines for handling exceptions, for storing an exception table, and for storing a jump table;
   the exception table being organized into segments, each of the segments for storing a plurality of instructions for handling a particular exception, the segments each having a segment starting address, the jump table having a plurality of entries, each of the plurality of entries having an entry address, and each of the plurality of entries for containing a branch instruction for branching to one of the set of routines; and
   a control logic unit, coupled to the memory, for mapping the memory as the exception table in response to a control bit being in a first logic state, the control logic unit for mapping the memory as the jump table in response to the control bit being in a second logic state.

2. The data processing system of claim 1, wherein the jump table comprises a consecutive list of the branch instructions.

3. The data processing system of claim 1, wherein the memory is a block erasable non-volatile memory.

4. The data processing system of claim 1, further comprising an address translation unit for displacing the jump table and/or the exception table within an address space of the memory.

5. The data processing system of claim 4 wherein the memory comprises at least two distinct memory devices being addressable by an internal address, the address translation unit being adapted to displace the jump table and/or the exception table within the address space of the memory.

6. The data processing system of claim 4 wherein the memory comprises a first portion and a second portion, the data processing system further comprising an external device having the first portion of the memory implemented therein and being coupled to the second portion of the memory by a bus.

7. The data processing system of claim 6 wherein the processing unit is a first microprocessor and the external device is a second microprocessor.

8. The data processing system of claim 1 wherein the memory mapping is carried out by a burst buffer controller in response to a control bit that is selectively set.

9. The data processing system of claim 1 wherein the exception table starts at one address of the memory and a portion of the jump table is moved by a predetermined number of addresses so that the jump table starts at another address of the memory.

10. A multi-processor system comprising:
- at least a first and a second microprocessor unit for executing instructions,
- a bus coupled between the first and second microprocessor units;
- a memory, accessible by the first and second microprocessor units, the memory for storing a set of routines for exception handling by the first and second microprocessors, for storing an exception table, and for storing a jump table; and
- a control logic unit, coupled to the memory, for mapping the memory for storing the set of routines in a first predetermined order in response to setting a control bit to a first logic state, wherein each of the set of routines includes instructions for handling a particular exception, the control logic unit for mapping the memory for storing the set of routines in a second predetermined order in response to setting the control bit to a second logic state, and each of the set of branch instructions is mapped in the memory based on starting addresses of each of the set of routines, and wherein the set of routines is relocated in the memory to a location separate from the set of branch instructions.

11. The multiprocessor system according to claim 10 wherein the memory comprises a first and a second portion, the first portion being implemented in the first microprocessor and the second portion being implemented in the second microprocessor, the set of routines and the set of branch instructions being stored in the first portion, the data processing system further comprising address translation logic for displacing the set of branch instructions and/or the set of routines by a predetermined amount within the first portion.

12. The multiprocessor system according to claim 11 further comprising a control bit field for determining a base address of the jump table to which the jump table is displaced by the address translation logic, so that if a reset operation occurs, the displacement of the jump table is automatically removed.

13. The multiprocessor system according to claim 11 further comprising a control bit field for selectively determining that the first portion is within a first address range and the second portion is within a second address range different from the first address range, and alternately for selectively determining that the first portion and the second portion are within the same address range.

14. The multiprocessor system according to claim 11 wherein the memory comprises first and second portions, the first portion being implemented in the first microprocessor and the second portion being implemented in the second microprocessor, the set of routines and the set of branch instructions being distributed between the first and second portions, and wherein a control bit field is provided for selectively determining that the first portion is within a first address range and the second portion is within a second address range different from the first address range, and alternately for selectively determining that the first portion and the second portion are within the same address range.

15. A method for operating a data processing system comprising the steps of:
- storing a set of routines for handling exceptions in a memory of the data processing system;
- organizing the set of routines in a predetermined sequence, each routine of the set of routines having a start address; and
- generating a jump table based on the start address of each routine of the set of routines, the jump table having entries, each entry having an entry address and containing a branch instruction to one of the set of routines, wherein the jump table is generated by mapping the start addresses to the entry addresses; and
- relocating the set of routines to other locations of the memory.

16. The method of claim 15 further comprising the step of displacing the jump table and/or the exception table within a virtual address space.

17. The method of claim 16 wherein the step of generating the jump table further comprises generated the jump table in response to a control bit being asserted.

* * * * *